US005272321A

United States Patent [19]

Otsuka et al.

[11] Patent Number: 5,272,321

[45] Date of Patent: Dec. 21, 1993

[54] AUTOMATIC VENDING MACHINE HAVING A BAR CODE READER AND BAR CODED COLUMNS AND SWITCHES

[75] Inventors: Hiromu Otsuka, Kounosu; Katsuyoshi Tajima, Fukiage; Jun Ehara, Ota; Hirota Shinozaki, Fukiage, all of Japan

[73] Assignee: Sanyo Electric Co., Ltd., Osaka, Japan

[21] Appl. No.: 741,862

[22] Filed: Aug. 8, 1991

[30] Foreign Application Priority Data

| | | | |
|---|---|---|---|
| Aug. 9, 1990 | [JP] | Japan | 2-212012 |
| Aug. 30, 1990 | [JP] | Japan | 2-229605 |
| Nov. 13, 1990 | [JP] | Japan | 2-307931 |

[51] Int. Cl.[5] G06F 7/08; G06F 15/20

[52] U.S. Cl. 235/381; 235/462; 364/479; 221/2; 221/7

[58] Field of Search 235/381, 385, 462; 364/479; 221/2, 7, 5

[56] References Cited

U.S. PATENT DOCUMENTS

| | | | |
|---|---|---|---|
| 3,606,959 | 9/1971 | Stonor | 221/2 |
| 4,519,522 | 5/1985 | McElwee | 235/462 |
| 4,608,487 | 8/1986 | Awane et al. | 235/383 |
| 4,636,963 | 1/1987 | Nakajima et al. | 364/479 |
| 4,639,875 | 1/1987 | Abraham et al. | 235/424 |
| 4,654,800 | 3/1987 | Hayashi et al. | 364/479 |
| 4,722,058 | 1/1988 | Nakayama et al. | 235/381 |
| 4,834,231 | 5/1989 | Awane et al. | 221/2 |
| 4,839,875 | 6/1989 | Kuriyama et al. | 235/385 |
| 4,896,791 | 1/1990 | Smith | 221/8 |
| 5,027,283 | 6/1991 | Phillips et al. | 364/479 |

*Primary Examiner*—Donald Hajec

*Assistant Examiner*—Esther Chin

*Attorney, Agent, or Firm*—Darby & Darby

[57] ABSTRACT

This vending machine automatically deals with articles for which printed article bar codes are given. The vending machine comprises a bar code reader for reading the article bar codes, data setting mechanism for setting data required for vending the articles based on the reading of the bar codes from the bar code reader, and sales management mechanism for managing sales information regarding the articles based on the bar codes read by the bar code reader. The vending machine may set data for individual species of articles required for vending thereof and manage sales data for the individual species, instead of controlling the operations for each article column, thereby removing errors involved in the latter controlled operation.

6 Claims, 14 Drawing Sheets

FIG. 6

| ARTICLE CODE | ARTICLE COLUMN | PRICE | SALES QUANTITY | SALES AMOUNT |
|---|---|---|---|---|
| 4223456789123 | NO.1·2·3 | ¥100 | 345PIECES | ¥34,500 |

AUTOMATIC VENDING MACHINE HAVING A BAR CODE READER AND BAR CODED COLUMNS AND SWITCHES

FIELD OF THE INVENTION

The invention relates to a venting machine having a plurality of article columns containing articles for sale carrying thereon bar-coded information for identification thereof. More particularly, the invention relates to an automatic vending machine capable of correctly controlling vending and sales management of the articles based on bar-coded data such as price, remaining number, sales account and the like of each article in the article columns.

BACKGROUND OF THE INVENTION

Conventional methods for controlling vending operations of an automatic vending machine is based on information obtained from printed bar code data on a label read by a code reader (See, for example, U.S. Pat. No. 4,608,487). Such bar codes include information needed for inputting preliminary data for reading further information and inputting instructions for vending operations. Since such bar-coded data may be input easily without any sophisticated keyboard operations, any untrained personnel may operate the machine in inputting such data.

However, conventional approaches to the management of the vending information of article in a vending machine are based on the information regarding the article columns, and not on the information on each article. For example, correspondence between each of the articles and respective article selection switch has been established by associating the column containing the article with the switch, as disclosed in Japanese Early Publication 63-90796). Other sales information, e.g. the amount of articles sold is also based on the record provided for the corresponding article column, as disclosed in Japanese Patent Early Publication 56-108187. Consequently, erroneous operation, and hence erroneous sales management, may occur if the correspondence between the column and the article is not established correctly.

BRIEF SUMMARY OF THE INVENTION

It is therefore a primary object of the invention to provide a reliable automatic vending machine which may correctly deals with articles based on the bar codes printed thereon for providing various data. More particularly, the vending machine may set data for individual species of articles required for vending thereof and manage sales data for the individual species.

The automatic vending machine according to the invention is characterized by a bar code reader for reading an article bar code attached on an article to be sold, data setting means for setting various data in connection with said articles based on the reading of said bar code by said bar code reader, sales management means for managing sales information regarding said articles based on the bar code read by said bar code.

The invention based on this principle may provide an automatic vending machine with article-wise control of article, rather than column-wise control of the article in the machine. Thus, the invention may provide accurate sales control, thereby overcoming the problem pertinent to the prior art vending machine.

BRIEF DESCRIPTION OF THE DRAWINGS

FIG. 6 shows a print-out of sales record.

DETAILED DESCRIPTION OF THE PREFERRED EMBODIMENT

Figure 1:
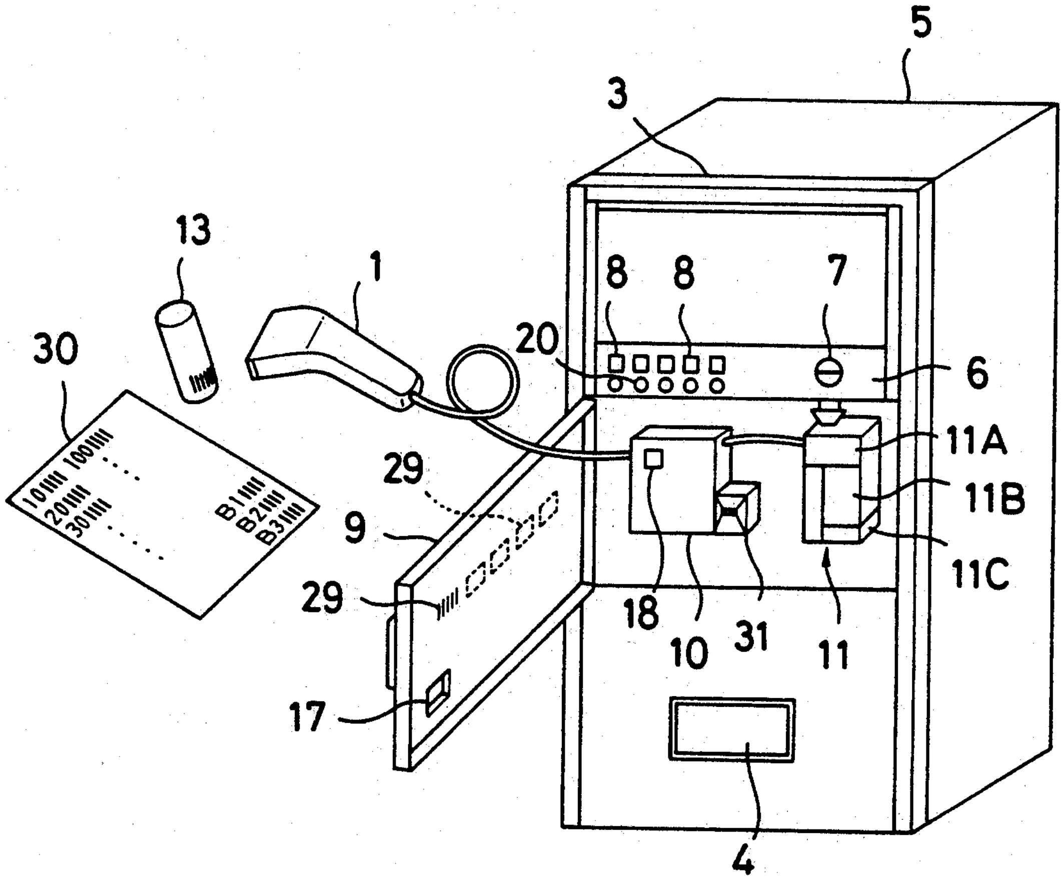
FIG. 1 is a perspective view of an automatic vending machine according to the invention.

As shown in FIG. 1, an automatic vending machine 5 has a customer panel 6 on its front door 3, said panel 6 having a coin slot 7 and a plurality of article selection switches 8, and indicators 20. The front door 3 is double walled and has a smaller door 9 which covers a control box 10 and a coin processor 11 installed in the door. A bar code reader 1 is connected with the control box 10. The control box 10 has therein a controller which comprises, for example a central processing unit (CPU). Next to the control box 10 is a printer unit 31 for printing out sales data. The coin processor 11 houses a coin selector 11A for counting the coins deposited in the coin slot 7, a coin receiver 11B, and a change dispenser 11C for dispensing change in the coin outlet 17. On the backside of the door 9 are a list of bar codes 29 (referred to as article selection switch designators) usable for identifying the article selection switches 8.

Figure 2:
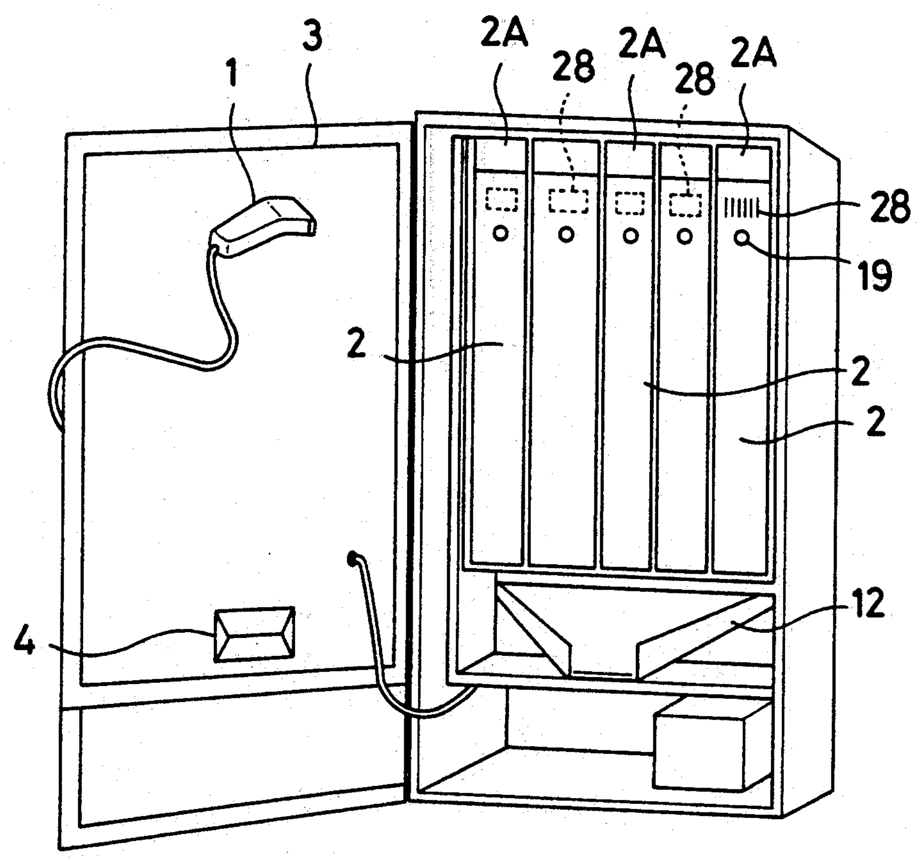
FIG. 2 is another perspective view of the automatic vending machine with its front door opened.

FIG. 2 shows the automatic vending machine with the front door 3 opened. It is seen that the automatic vending machine has 5 article columns 2, below which is a chute 12 extending to an article outlet 4, for leading articles from the columns 2 to the outlet 4. The article columns 2 have at their top ends article replenishing inlets 2A, through which articles are supplied into the columns 2. Each of the columns 2 has a bar-coded column designator 28 usable for identifying the column. The column codes represent the column number assigned to the respective columns 2.

Figure 3:
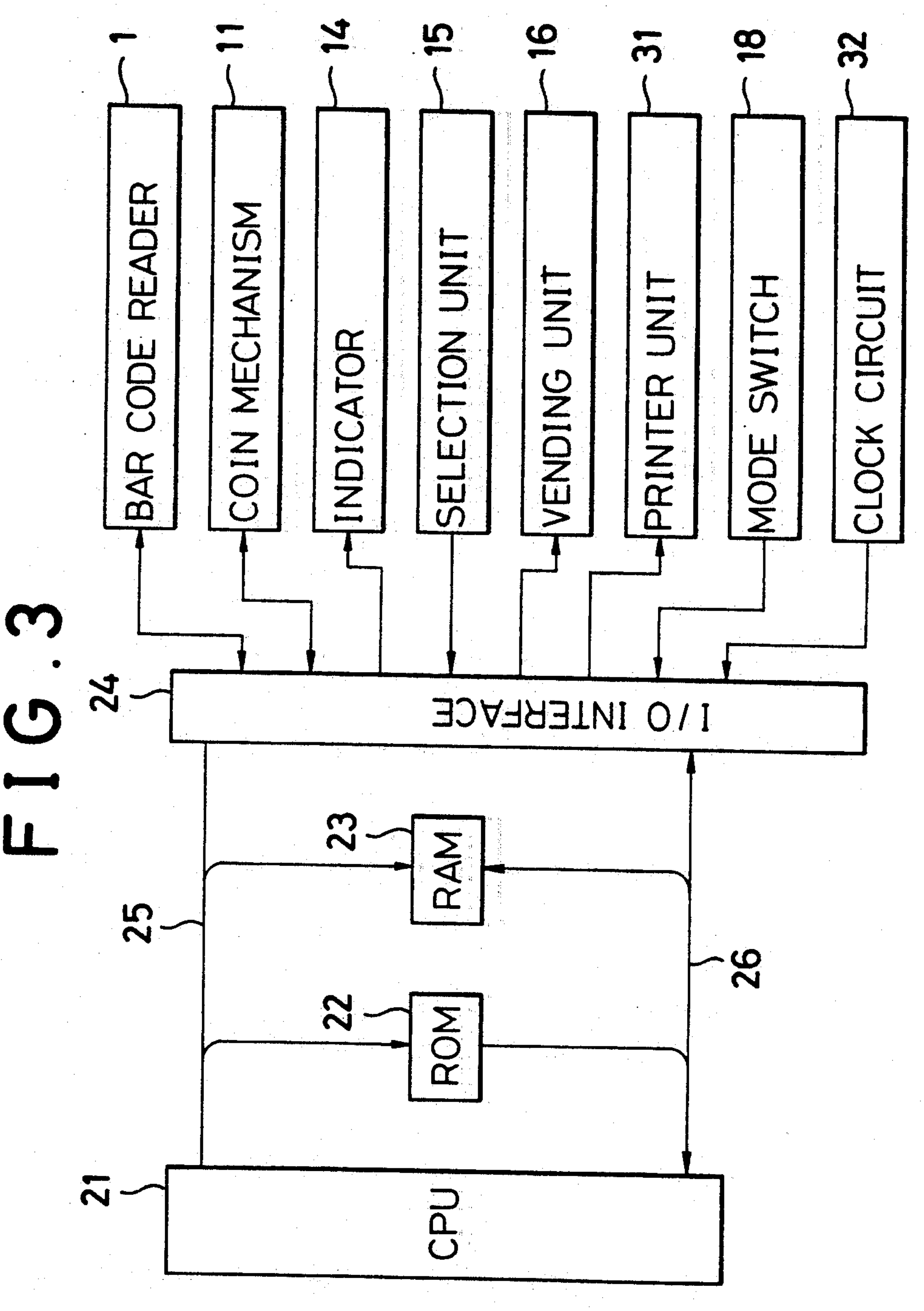
FIG. 3 is a block diagram of a control circuit of the automatic vending machine of FIG. 1.

FIG. 3 is a block diagram of a control circuit for use with the automatic vending machine 5. The controller housed in the control box 10 includes a central processing unit (CPU) 21 for controlling the operation of the automatic vending machine 5 in a manner as prescribed by a program. The CPU 21 is connected with a ROM 22, a RAM 23, an I/O interface 24 via an address bus 25, and a data bus 26. The I/O interface 24 is in turn connected with the bar code reader 1, the coin processor 11, an indicator means 14, a selection means 15, a vending means 16, a mode switch 18 for selecting a mode for inputting bar-coded data (which will be referred to as bar-coded data input mode), and a printer unit 31.

The coin processor 11 determines whether the coin deposited in the slot 7 is proper or not based on a judgement made by a coin selector 11A. If it is proper, the coin processor 11 outputs to the CPU 21 via the I/O interface 24 a signal indicative of this fact. The coin processor 11 activates a coin change unit 11*c* to pay change when so instructed by the CPU 21 via the I/O interface 24.

In this example the indicator 14 includes five indicators 19 each of which is associated with corresponding one of the article columns 2, five selection switch indicators 20 each of which is associated with corresponding one of article selection switches 8. Each of these indicators is controlled by indication data received from the CPU 21 via the I/O interface 24. The selection switch indicators 20 are provided on the customer panel 6. In normal sale mode, they serve as vending article indicators for indicating those articles, by lighting corresponding lamps, that customers may purchase for the money deposited.

The selection means 15 includes a plurality of article selection switches 8 (FIG. 1), and outputs to the CPU 21 via the I/O interface 24 a signal indicative of an article selected by one of the switches 8.

The vending means 16 includes motors associated with corresponding article columns 2. The CPU 21 generates signals to actuate one of these motors via the I/O interface 24 to deliver a selected article.

The mode switch 18 (FIG. 1) is operated to put the automatic vending machine 5 in the bar-coded data input mode. The CPU 21, upon receiving a signal from the mode switch 18, actuates the bar code reader 1. The bar code reader 1 may then read an article code on the article 13 (FIG. 1), column codes indicated on the column designators 28 (FIG. 2), article selection switch codes indicated on article selection switch designators 29 (FIG. 1), and a list of bar codes printed on a sheet 30.

The sheet 30 bears thereon printed bar codes for providing information relevant to the operation of the automatic vending machine. In a preferred embodiment, the sheet 30 includes a plurality of coded prices of the articles as well as codes representative of initial values needed for resetting counters for counting the number of articles to be replenished and the number of remaining articles. Such resetting is initialized by reading an initialization code B1 on the sheet 30 by the code reader 1. The sheet 30 further includes a sales account code B2 for instructing the automatic vending machine to keep account of sales.

The article code is a commonly used bar code employed for POS systems, which is called JAN code in Japan and UPC code in the USA. This code includes a country code defined by the first two digits (e.g. 49 which is assigned to Japan), a manufacturer code defined by the next five digits, and an article code defined by the next five digits (which are altogether referred to as article code for simplicity), and one check digit. If the number read from the first two digits is 49, the code is identified as JAN. In this manner the automatic vending machine may distinguish any other country by reading the bar-coded first two digits printed on such sheet.

A printer unit 31 prints out sales account based on the data received from the CPU 21 in response to the operation of an accounting switch 32.

Figure 4A:
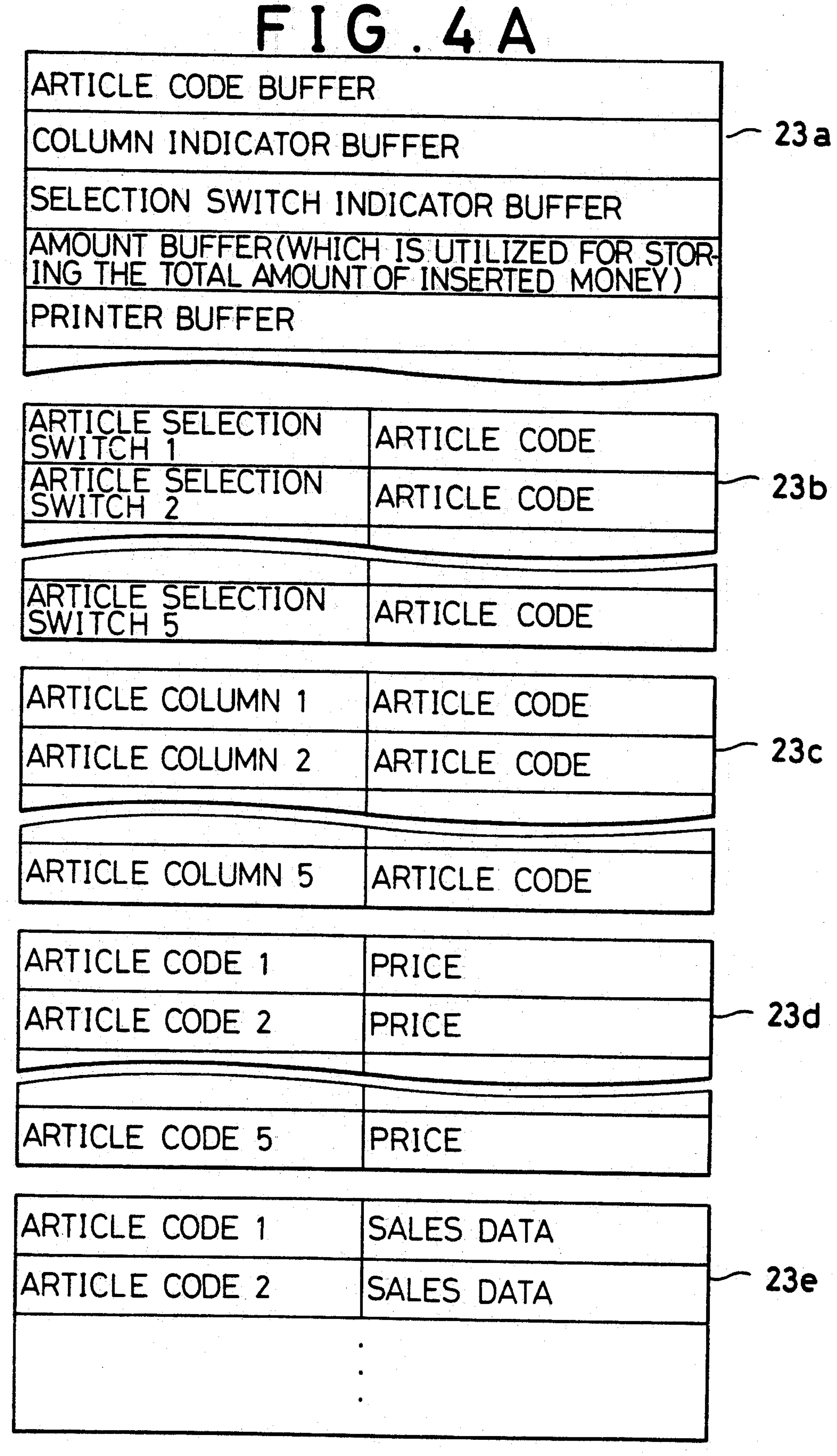
FIGS. 4A and 4B illustrate a conceptual memory map of a RAM of the control system of FIG. 3.
Figure 4B:
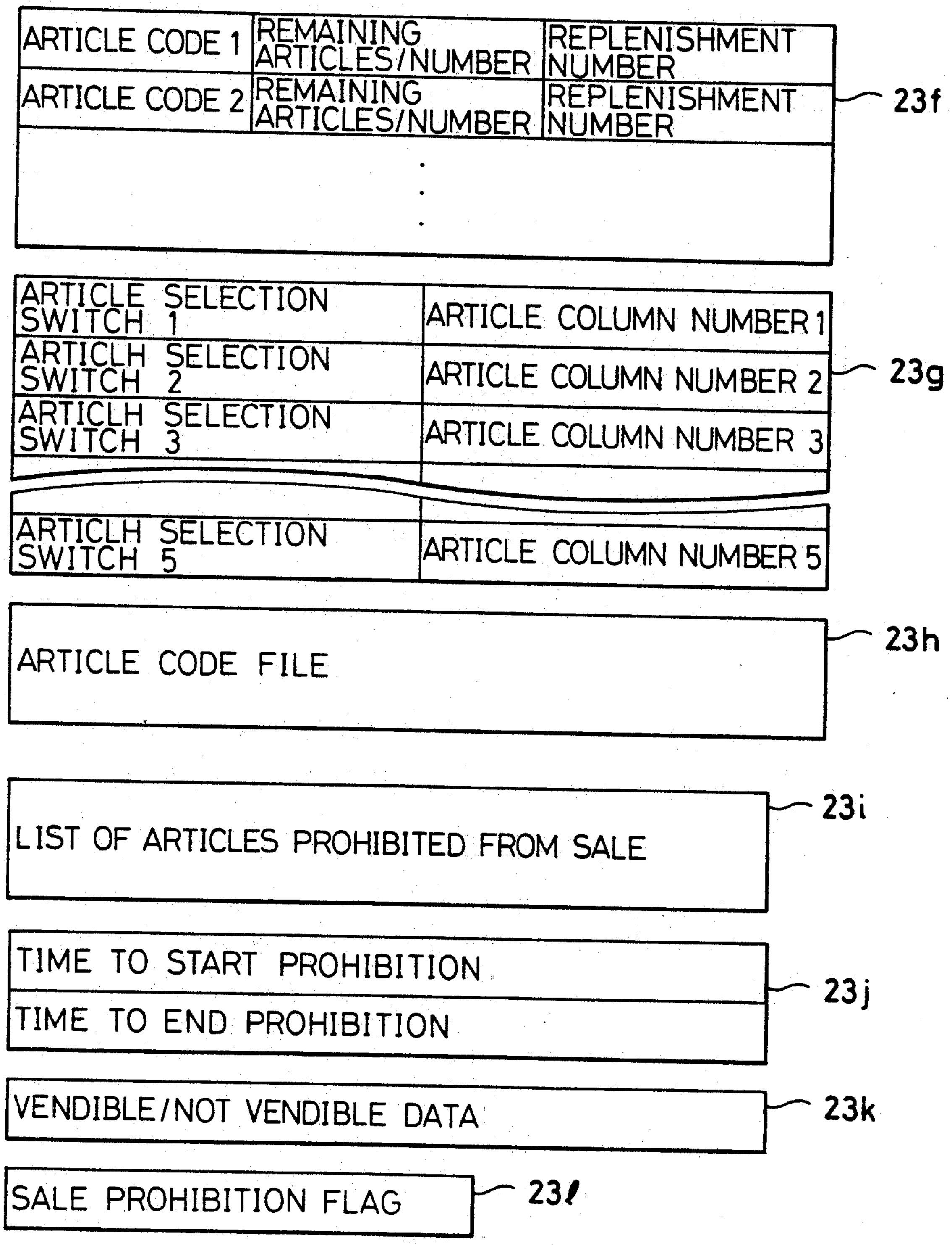
Figure 5A:
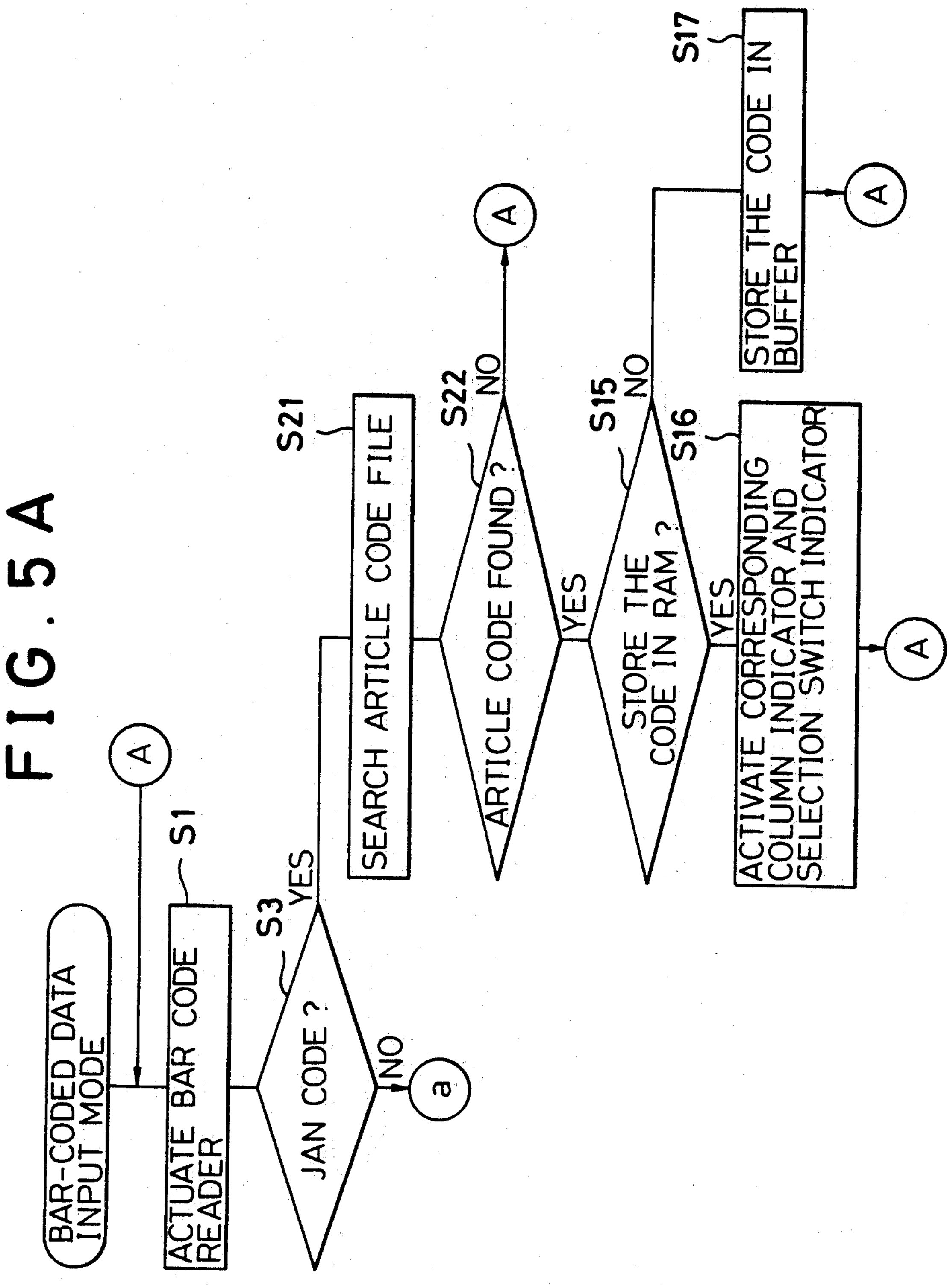
FIGS. 5A–5E are flowcharts of the operations in bar-coded data input mode.
Figure 5B:
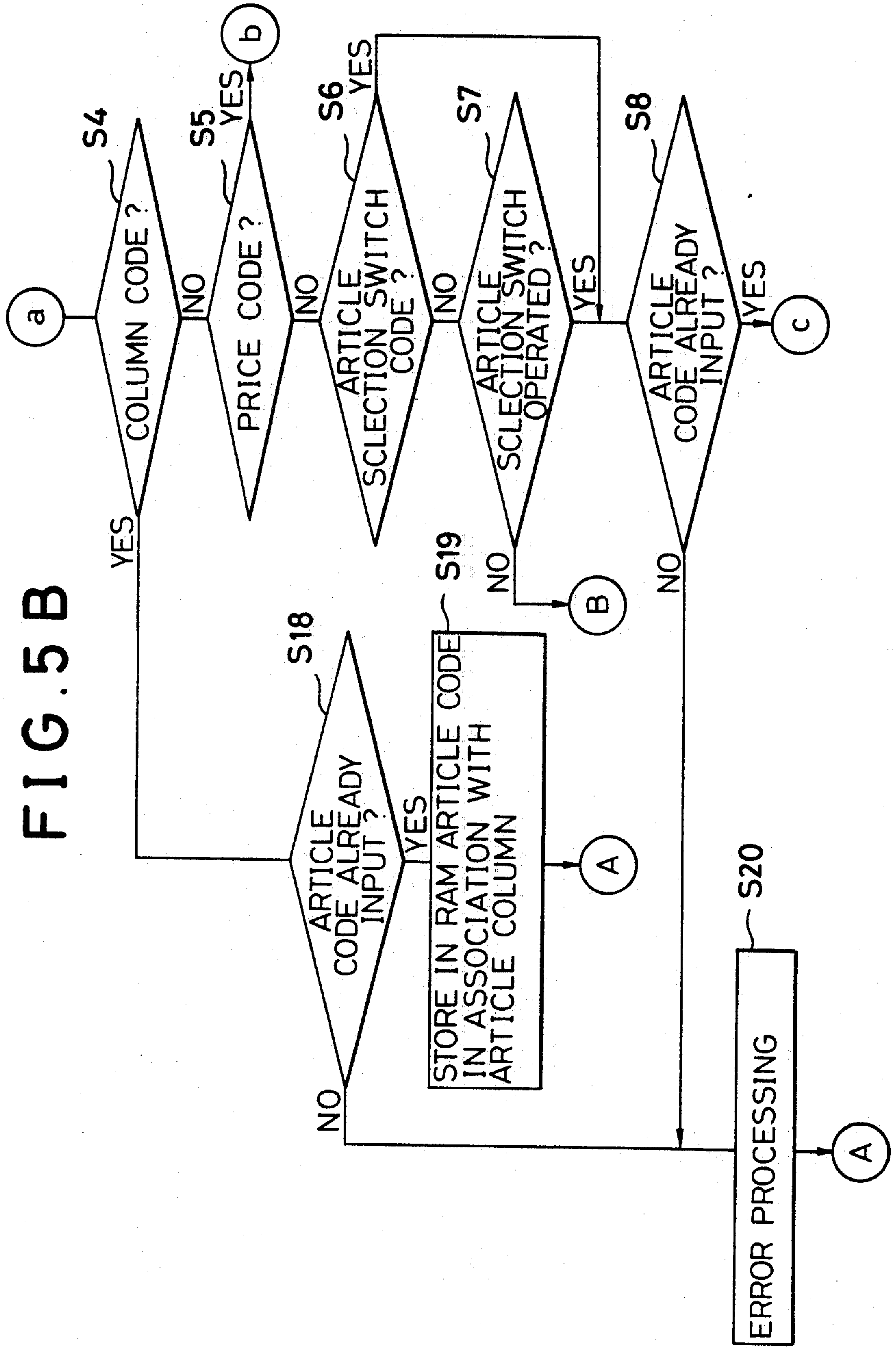
Figure 5C:
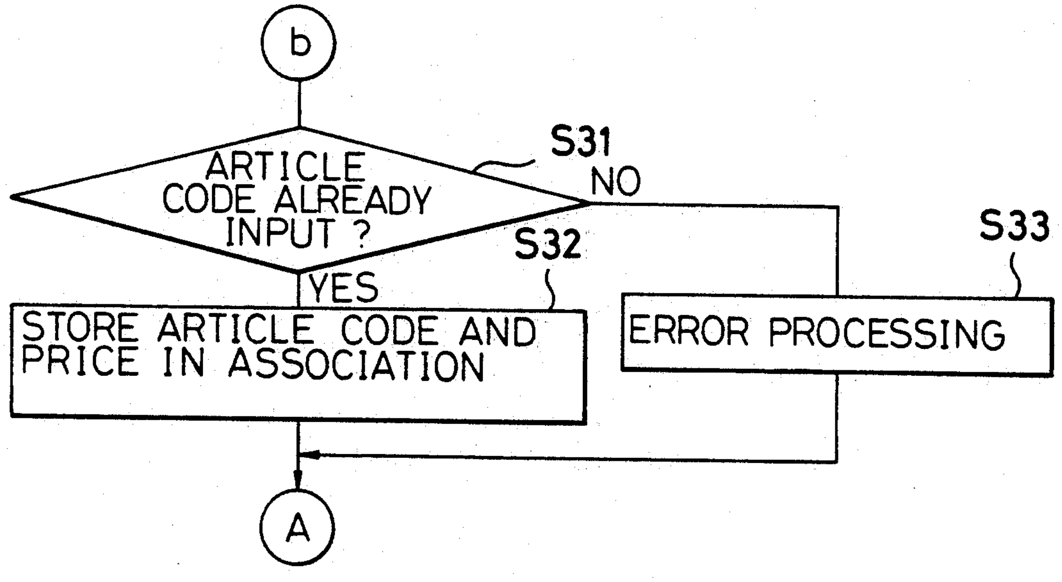
Figure 5D:
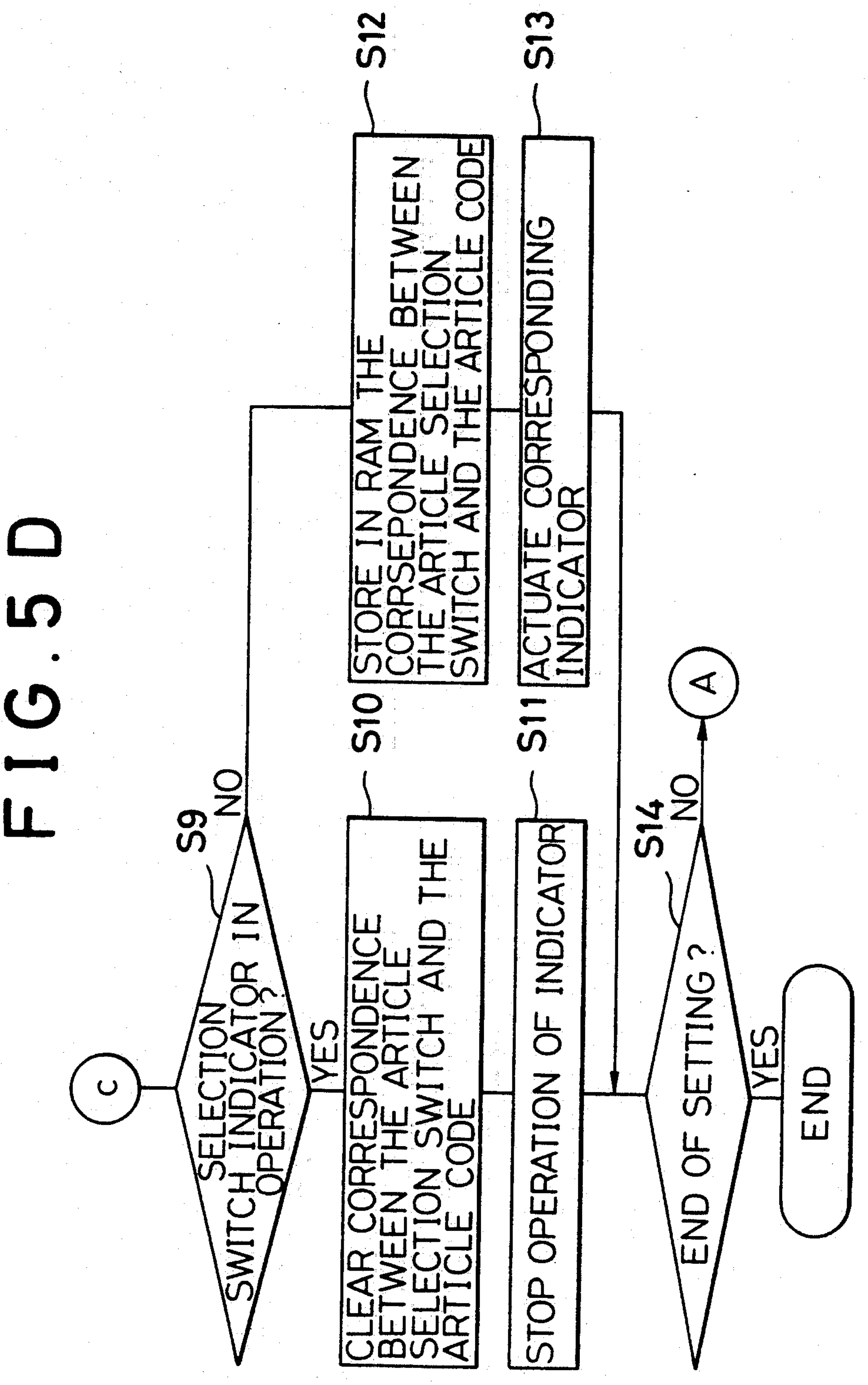
Figure 5E:
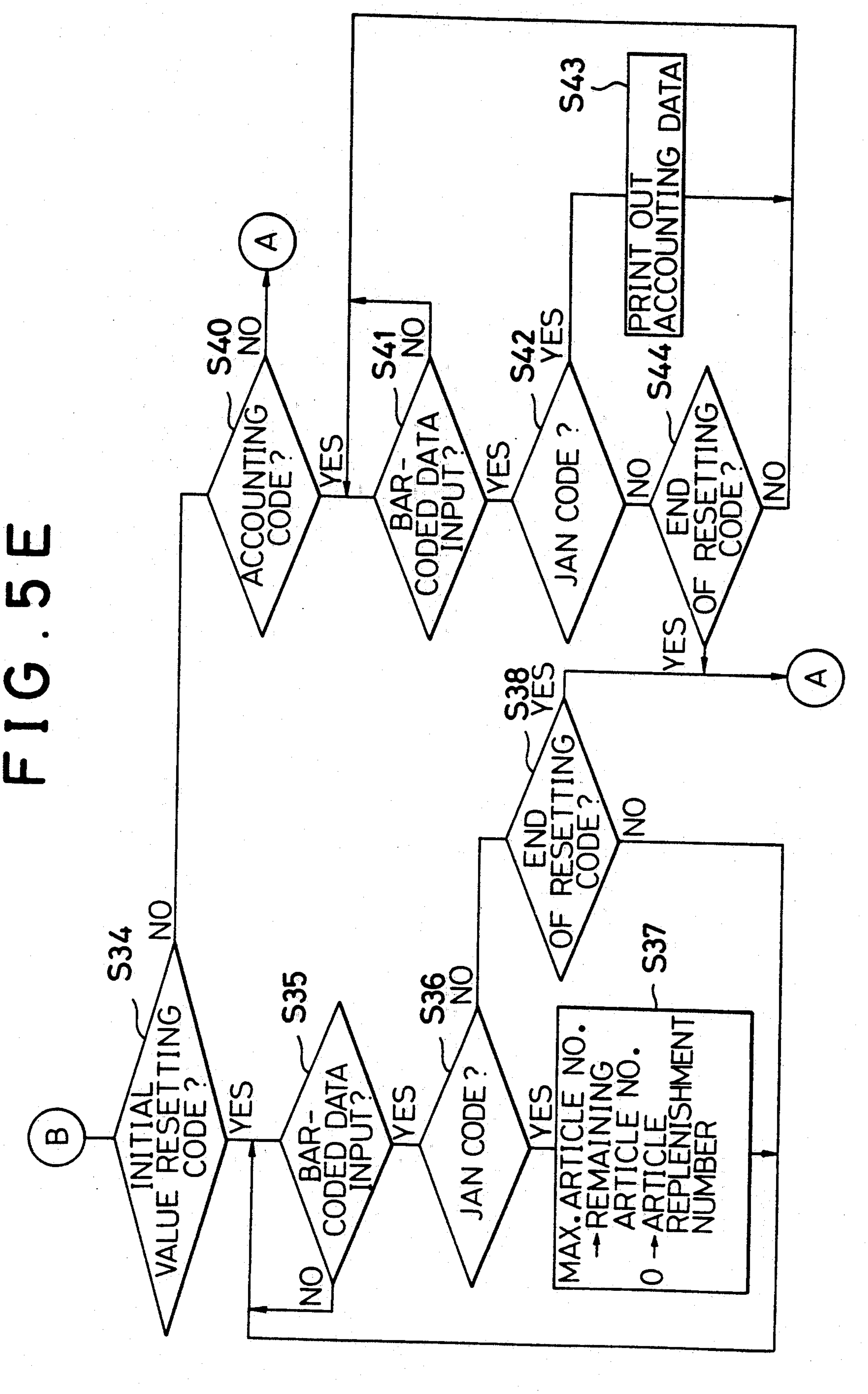

FIGS. 4A and 4B illustrate a memory map in a RAM. A memory region 23*a* is a memory buffer which includes an article code buffer for storing the article code read by the bar code reader 1, a column indicator buffer, a money buffer for storing the amount of money deposited, and a printer buffer. The column indicator buffer stores five-bit binary data for the five-bit column indicator 19 for indicating the presence of articles by turning on the corresponding lamps and the absence of the articles by turning off the corresponding lamps. The presence and absence corresponds to a binary level of "1" and "0", respectively. The selection switch indicator buffer stores 5-bit binary data for the selection switch indicators 20 by turning on ("1") or off ("0") corresponding lamps thereof.

A memory region 23*b* stores bits representative of the correspondence between the articles to be sold and the selection switches 8. The memory region 23*b*, thus, has addresses equal in number, 5 in this example, with the selection switches 8.

A memory region 23*c* stores bits representative of the correspondence between article columns 2 and the corresponding codes of articles stored in the columns 2, and hence has addresses equal in number, which is 5 in this example, with the article columns 2.

A memory region 23*d* stores the article codes and the prices of the articles having the corresponding codes. In this example the memory region 23*d* of the automatic vending machine 5 has five addresses since there are five article columns for at most five different articles. The prices of the articles may be read by the bar code reader 1 from the bar code printed on the sheet 30 and stored in this memory.

A memory region 23*e* stores sales data such as total amount of money for the sale and the number of articles sold for each of the article codes.

A memory region 23*f* serves as a counter which counts the number of articles remaining in the article columns and the number of articles to be supplied. The number of the remaining articles (which will be referred to as remaining articles number) is counted down and the number of articles to be supplied (which is referred to as article replenishment number) is counted up every time an article is sold. Thus, the manager can easily confirm these numbers.

In view of the necessity that the remaining article number must be reset to the maximum number of articles that may be stored in the column and the replenishment number reset to zero when an article column is replenished, the ROM 22 is programmed so as to reset these numbers for each column 2 at the time of replenishment based on instruction data indicative the replenishment.

A memory region 23*g* stores bits for establishing correspondence between the article selection switches 8 and corresponding columns, and therefore has addresses equal in number, 5 in this case, with article selection switches 8.

A memory region 23*h* is provided for storing a file of the article codes. That is, the file stores a list of the codes of the articles to be sold with the automatic vending machine.

A memory region 23*i* is preloaded with a list of the codes of those articles not to be sold by regulations during certain times (which time will be referred to as sale prohibition times).

A memory region 23*j* stores the sale prohibition times for the articles mentioned above.

A memory region 23*k* stores bits "1" and "0" indicative of permission or prohibition of sale, respectively, for each column 2. During a time articles in a particular column are sold out or prohibited to be sold, the memory region is loaded with the prohibition bit "0". The memory region is also loaded with bit "0" in the case of malfunction of the corresponding column.

A memory region 23*l* stores flags for prohibiting sale during prohibition times.

The bar-coded data input mode and the sale mode operations of the automatic vending machine 5 will be now described.

A. BAR-CODED DATA INPUT MODE

The bar-coded data input mode is initiated by the operation of the mode switch 18. The relevant procedure for the mode proceeds in CPU 21 as indicated by a flowchart shown in FIGS. 5A–5E.

I. DATA SETTING

The CPU 21 provides the bar code reader with a driving data (step S1) for enabling the manager to input the price of an article from the bar code printed on the sheet 30 and the article code from the label on the article 13, etc. In this way the CPU obtains needed data and distinguishes the kinds of the data in steps S3, S4, S5, and S6.

In step S3, if the bar code is found to be a JAN code, the procedure jumps to step S21, where the CPU 21 extracts an article code and searches the article file **23*h* for the identical article code. If the identical article code is found in the file 23*h* (step S22), the procedure advances to step S15. If, however, the identical article code is not found in the files 23*h*, the procedure returns to step S21. Articles having no corresponding registered article codes will not be registered by the CPU 21**, since they are not to be sold by the automatic vending machine.

In step S15, the CPU 21 judges if the article code obtained from the JAN code in step S3 is stored in the memory regions **23*b* and 23*c* of the RAM 23. If it is, the procedure advances to step S16 to activate the column indicator 19 and the selection switch indicators 20**.

That is, in the case when the CPU 21 finds out in the memory region **23*b* the article code associated with the article selection switch 8, the CPU 21 stores indication data in a selection switch indicator buffer of the RAM 23. The indication data are needed for instructing how the selection switch indicator 20 is driven. The CPU 21 then outputs the data to the indicator 14. The CPU 21 then finds out in the memory region 23*c* which of the article column 2 corresponds to the article code, and stores indication data in a column indicator buffer of the RAM 23 associated with the article column 2. The data are needed for instructing the CPU 21 which column indicator 19 is to be driven. The CPU 21 outputs the indication data to the indicator 14**.

If in step S15 the article code is found not stored in the memories **23*b* and 23*c***, the procedure advances to step S17 to store the code in the article code buffer.

In step S4 if the bar code read in step S2 is found to be a column code, the process advances to step S18, where the article code is looked for in the article code buffer. If it is found therein, the process advances to step S19 where the CPU 21 stores the code in the memory region **23*c* of the RAM 23 having the address associated with the article column 2 assigned to the article. If on the other hand the code is not stored in the article code buffer, the process moves to step S20. In this step S20 the CPU 21** execute an error routine. The process then returns to step S1.

In step S5, if the bar code read in step S2 is found to be a price code, the procedure proceeds to step S31, where the article code for the article is looked for in the article code buffer. If it is stored therein, the procedure proceeds to step S32. If it is not stored therein, however, the CPU 21 execute an error routine in step S33.

In step S32 the CPU 21 stores the article code from the article code buffer and stores the code in the memory region **23*d* of the RAM 23 along with the corresponding price read from the bar code on the sheet 30 by the bar code reader 1. In this manner the price of an article is input in the corresponding region of the RAM 23 by reading the bar code on the article by the bar code reader 1 and then reading the bar code on the sheet 30 representing the price of the article again by the bar code reader 1**.

In step S6, if the CPU 21 identifies the bar code read in step S2 to be an article selection switch code the procedure proceeds to step S8.

Selection of a switch 8 may be made either by reading the article selection switch codes or by directly operating the switch 8. Therefore, if the input bar code read in step S6 is found to be one other than article selection switch codes, the procedure advances to step S7 to determine if an article selection switch 8 has been operated. If it has, the procedure advances to step S8.

In step S8 the CPU 21 searches the article code buffer for the article code. If the code is found out, then the procedure advances to step S9. If the code is not found out, the CPU 21 executes the error routine in step S20.

In step S9, the CPU 21 judges if the selection switch indicator 20 associated with the selected switch 8 is in operation based on the indication data stored in the selection switch indicator buffer. If it is, the procedure further advances to step S10, where the CPU 21 clears the memory reserved for the article selection switch 8. In the next step S11 the CPU 21 stores in the selection switch indicator buffer an indication data needed for turning off the selection switch indicator 20 associated with the selection switch 8, and outputs the data to the indicator 14.

When, however, the selection switch indicator 20 is not in operation for the corresponding article selection switch 8, the CPU 21 proceeds to step S12 where the CPU 21 retrieves the article code from the article code buffer and stores the code date in the memory region **23*b* of article code buffer having an address corresponding to the selected article switch 8. The CPU 21 then advances to the next step S13 and stores the indication data in the selection switch indicator buffer and outputs the data to the indicator 14**.

In this manner, by reading the article code contained in the JAN code and the column code for the article column 2 by the bar code reader 1, the article code contained in the JAN code is stored in the memory region **23*c* having the address corresponding to the article column 2. Also, by reading the JAN code and the article selection switch code corresponding to a selected article selection switch 8 or by actually operating an article selection switch 8 subsequent to the JAN code reading, the article code data contained in the JAN code are stored in the memory region 23*b* having the address corresponding to the article selection switch 8. If the JAN code reading and subsequent designations of the article selection switch 8 and article column 2 are carried out in succession, the correspondence between the article selection switch 8 and the article code as well as the correspondence between the article column 2 and the article code may be established simultaneously. If in this case the bar-coded price is also read from the sheet 30**, the price may be set for the article.

II. INITIAL VALUE SETTING FOR THE REMAINING ARTICLES NUMBER AND THE ARTICLE REPLENISHMENT NUMBER

The remaining articles number and the article replenishment number for an article column are reset when the column is replenished, by scanning a code B1 (which will be referred to as initial value resetting code) provided on the sheet 30 for resetting initial values by the bar code reader 1.

Therefore, if the bar code read is found to be an initial value resetting code in step S34, the procedure proceeds to step S35 to read a further bar code by the bar code reader 1. The procedure then advances to step S36 where a judgement is made whether the bar code read in the step 35 is a JAN code or not. If it is, the process proceeds to step S37 where the CPU 21 extracts the article code from the JAN code and resets the remaining article number and the article replenishment number in the memory region 23*f* associated with the article code. This is done by storing prescribed initial values in the memory region. The CPU 21 sets the initial article replenishment number 0, and sets the initial remaining articles number maximum number of the articles allowed for the corresponding column 2. The corresponding column may be found from the code stored in the memory region 23*c*. The maximum number may be obtained from the memory region 22. The CPU 21 then returns to step S35 to wait for the next bar code data received from the bar code reader 1.

After resetting the remaining articles number and the article replenishment number, the bar code B3 on the sheet 30 is scanned by the bar code reader 1. The bar code B3 is provided for instructing the CPU the end of the resetting operation. The CPU then returns to step S1 when the end of the resetting operation is instructed in step S38.

III. SALES ACCOUNT

In order to instruct the CPU 21 to make an sales account report, it is necessary to scan sales account bar code B2 printed on the sheet 30 by the bar code reader 1.

If in step S40 the bar code read by the bar code reader 1 is found to be the sales account bar code, the procedure proceeds to step S41, where a judgement is made as to whether or not the code read in this step is a JAN code. If it is, the CPU 21 extracts the article code from the JAN code in step S43, retrieves the sales account data stored in the memory region 23*e*, stores them in a print buffer, and outputs them to a printer unit 31 which prints out a report of sales account data as shown in FIG. 6.

After sales account has been reported, the bar code B3 is again scanned by the bar code reader 1 in step S44 for terminating this sales accounting. The procedure then returns to step S1.

Figure 7A:
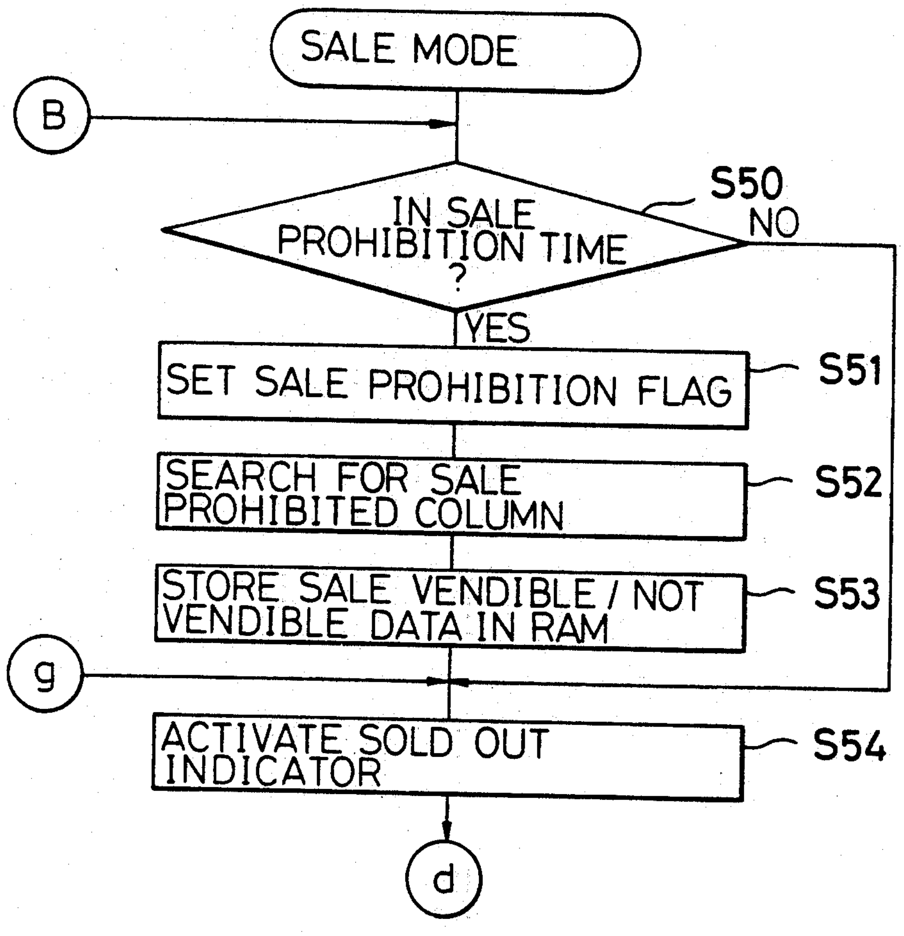
FIGS. 7A–7C are flowcharts of the operations in sale mode.
Figure 7B:
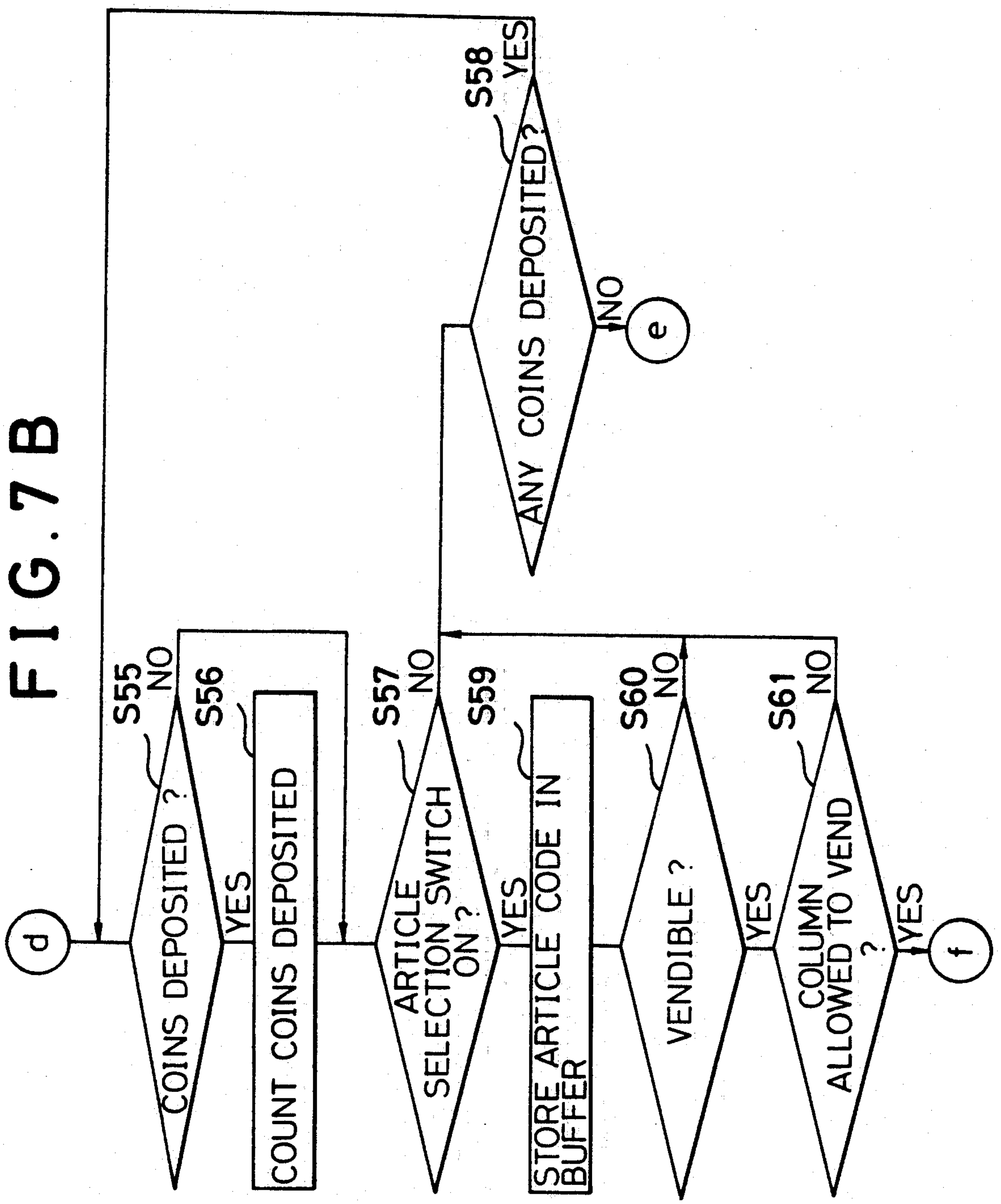
Figure 7C:
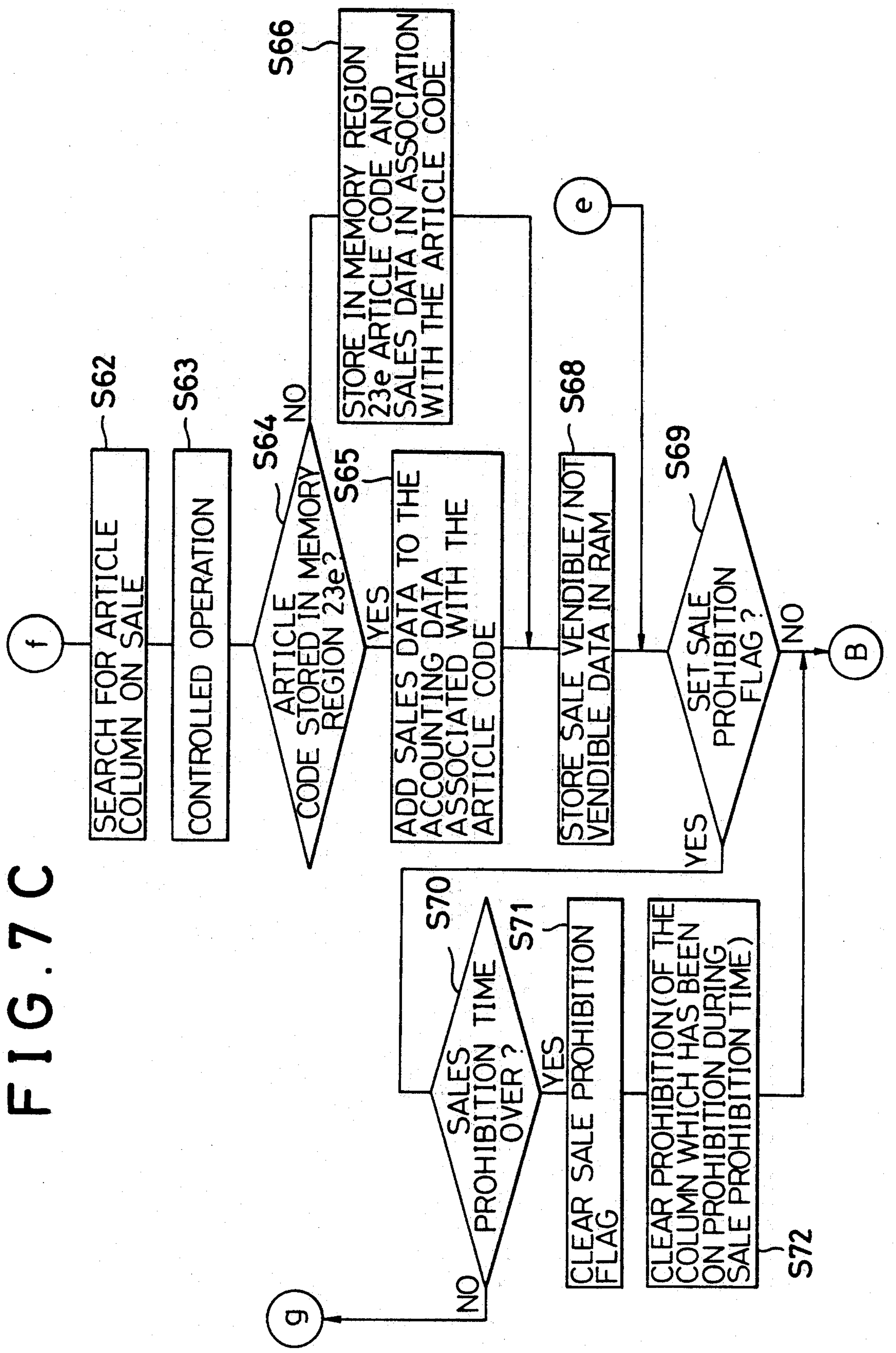

When a mode switch 18 is operated again after the completion of the bar-coded data input mode described above, the CPU 21 stops the operation of the bar code reader 1 and begins a sale mode described below and outlined in the flowchart shown in FIGS. 7A-7C.

IV. SALE MODE

First, the CPU 21 checks in step S50 if it is sale prohibition time based on the time data provided by a clock circuit 32 and data stored in the memory 23*j*. If it is not, the procedure advances to step S54, or otherwise to step S51. In step S51, a sale prohibition flag is set in the memory region 23*k* for prohibiting sale. In the next step S52 the CPU 21 checks if there is any article in the article columns 2 prohibited from sale for that prohibition time. This check is made by comparing the article codes stored in the memory region 23*c* with those stored in the memory region 23.

In step S53, the CPU 21 make a vendible/not vendible data according to this check, and stores the vendible/not vendible data in the memory region 23*k*. That is, in this step S53, based on the result of the comparison, the CPU 21 finds the articles whose article code stored in the memory region 23*c* match one of the codes stored in the memory region 23*i*, and changes their flag bits in the memory region 23*k* from "1" to "0". As the result of these flags set in the memory region 23*k*, the articles are dealt with the same as those which are sold out.

In the next step S54 the conditions of these flags are transferred to a sold-out indicator buffer, and output to the indicator 14 to activate the indicator lamps 30 associated with the "0" flags in the memory region 23*k*, thereby indicating that the articles are not on sale.

In step S55, the CPU 21 judges if a signal representative of the amount money deposited is transmitted from the coin processor 11. If the signal is received, the amount is added to the amount stored in the money buffer (step S56). In the next step S57, a judgement is made whether an article has been selected by an article selection switch 8. If an article has been selected, the procedure proceeds to step S59, where the article code for the article selected by the article selection switch 8 is retrieved from the memory region 23*b* of the RAM 23. The code is then stored in the article code buffer. In the next step S60, the CPU 21 checks if the sale of the selected article is valid by comparing the price of the article retrieved from the memory region 23*d* of the RAM 23 with the amount of money stored in the money buffer.

If the sale is valid, the procedure proceeds to step S61 where, referring to the article code stored in the article code buffer, the pertinent article column 2 containing the article is identified from the data stored in the memory region 23*c* of the RAM 23, and a judgement is made, based on the data stored in the memory region 23*k*, whether the article column 2 is subject to a prohibition. If it is not, the procedure proceeds to step S62. If, however, it is found that the article selection switch 8 has not been operated in step S57, or that the amount of the money is not sufficient for the price, or that the article column is subject to a prohibition, the procedure proceeds to step S58. In this step a determination is made whether the amount of money is zero or not. If it is not zero, the procedure returns to step S55 to wait for further deposition of money. On the other hand, if it is zero, the procedure proceeds to step S64.

If the article selected is not subject to a prohibition, the procedure proceeds to step S62, where, referring to the article code stored in the article code buffer, the pertinent article column 2 containing the article is identified from the data stored in the memory region 23*c* of the RAM 23. In the next step S63, the CPU 21 actuates a driving motor of the article column 2 for delivering the article in a controlled manner, and at the same time calculate the amount of change, and operates the coin processor 11 if required.

After finishing the sale of that article, the procedure proceeds to step S64, where a determination is made whether or not the article code of the article stored in the article code buffer is stored also in the memory region 23*e* of the RAM. If it is, i.e. the memory region 23*e* has an address for the sales account for the article, the procedure advances to step S65 where the CPU 21 add sales data to the sales account already stored in the memory region 23*e* for the article, and then proceeds to step S67 for controlled vending operation.

If the article code for the article is not stored in the memory region 23*e*, the procedure proceeds from step S64 to step S66 where the article code and the sales data are stored in the memory region 23*e*, thereby making a sales account in the memory for the article. The procedure then proceeds to step S67.

The procedure in step S67 is a controlled vending operation for actuating a driving motor to deliver an article from the selected article column 2 and preparing change if necessary by the coin processor 11.

After finishing the vending operation, the CPU 21 advances to step S68 to check if there is any emptied article column 2, and, if there is, overwrites the corresponding bit "1" in the memory region 23*k* for the article column 2 by "0".

In the next step S69 the CPU 21 checks if a sale prohibition flag is set in the memory region 23*h* and, if it is set, proceeds to step S70, where the CPU 21 obtains the present time from a clock (not shown) and judges if the time belongs to the sale prohibition time. If it does not, the CPU 21 returns to step S54, but otherwise proceeds to step S71 to clear the sale prohibition flag. In the next step S72, the sale prohibition flag is also cleared if the prohibition time for the corresponding sale article is over, so that the article column 2 for the article will participate in sales. This is done by rewriting "0" bit in the memory region 23*k* for the article to "1". The memory region 23*k* thus now stores bits "1" solely for the articles which are sold out or suspended in sale due to malfunction of the associated article column 2. The procedure now returns to step S50.

In summary, in the data input mode the automatic vending machine 5 is adapted to store article codes read by the bar code reader 1 in the memory region 23*c* of the RAM 23 for each articled in the article columns 2. The codes are compared with the codes stored in the memory region 23*i* of the articles which are prohibited from sale for the time, to thereby automatically control the vending operation of the corresponding article column 2.

We claim:

1. An automatic vending machine for vending articles for which printed article bar codes are given, comprising:

a memory means for storing the article codes of articles that may not be sold for certain times;

means for prohibiting sales of said articles based on the article codes stored in said memory means during said times.

2. An automatic vending machine for vending articles bearing thereon printed article code in the form of a bar code, comprising:

a plurality of article selection switches for selecting articles;

a first memory means for storing article codes in association with said article selection switches;

a plurality of article storage columns for storing said articles in a corresponding one of said columns;

a second memory means for storing article codes in association with respective article storage columns;

a bar code reader for reading said printed article codes when operated by an attendant;

first write means for writing an article code at an address in said first memory when said article code is read by said bar code reader, said address in said first memory being designated by specifying one of said article selection switches;

second write means for writing an article code at an address in said second memory when said article bar code is read by said bar code reader, said address in said second memory being designated by specifying one of said article storage columns; and means for establishing correspondence between said article selection switch and said article storage column associated with said article code by searching said first and second memories for correspondence between said article selection switch and article code and for correspondence between said article code and said article storage columns.

3. The automatic vending machine as recited in claim 7, further comprising bar codes, one for each of said article selection switches for use in specifying said switches.

4. The automatic vending machine as recited in claim 7, wherein said article selection switch is operable for specifying said article selection switch for designation of said addresses in said first and second memories.

5. The automatic vending machine as recited in claim 2, further comprising means for accounting the sales of merchandise for articles specified by corresponding article codes registered in one of said first and second memory means.

6. The automatic vending machine as recited in claim 2, further comprising means for managing merchandise information regarding said articles for articles specified by corresponding article codes registered in one of said first and second memory means.

* * * * *